Patented Feb. 19, 1935

1,991,688

UNITED STATES PATENT OFFICE 1,991,688

α,α-ANTHRACENE - DICARBONYL-CHLORIDE AND PROCESS OF PREPARING THE SAME

Ralph N. Lulek and Melvin A. Perkins, Milwaukee, Wis., assignors to E. I. du Pont de Nemours & Company, Wilmington, Del., a corporation of Delaware No Drawing. Original application April 10, 1933, Serial No. 665,441. Divided and this application August 26, 1933, Serial No. 687,011

7 Claims. (Cl. 260—123)

This application is a division of our copending application Ser. No. 665,441, filed April 10, 1933.

The invention herein described deals with novel organic compounds which may be used as intermediates for vat dyestuffs.

More particularly, this invention deals with α,α-anthracene-dicarbonyl-chlorides of the general formula

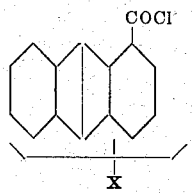

wherein X stands for another COCl group in an alpha position. We prepare these novel compounds by starting with the corresponding α,α-anthracene-dicarboxylic acid and converting the same in the usual manner into the corresponding dicarbonyl-chloride.

Without limiting our invention to any particular procedure, the following examples will serve to illustrate our preferred mode of operation. Parts are by weight.

Example 1

15 parts of 1,4-anthracene-dicarboxylic acid, obtained from the corresponding anthraquinone-dicarboxylic acid by reduction with zinc and ammonia (Elbs, Journal für Praktische Chemie (2), 41, 30, and Phillips, Journal of the American Chemical Society, 46, 2533), are introduced into 45 parts of water-free benzol at room temperature. 25 parts of phosphorus pentachloride are now added and the mixture is agitated until nearly all is in solution. Heat is then applied gently and the solution is heated to reflux for about 15 minutes or until hydrochloric acid evolution has ceased. The dark reddish solution is then allowed to cool slowly, separating deep red crystals. Agitation is then applied and 70 parts of petroleum ether are added. The red crystals are filtered by suction, washed with petroleum ether (90 parts) and dried. The yield is good and the deep red crystalline product analyzes about 23% chlorine. (Theory for 1,4-anthracene-dicarboxylic acid chloride=23.4% Cl.)

Example 2

10 parts of 1,5-anthracene-dicarboxylic acid (pale, greenish-yellow solid made by reduction of 1,5-anthraquinone-dicarboxylic acid by means of zinc and ammonia—Scholl, Berichte, 62, 109) are suspended in 50 parts of water-free benzol and 16.5 parts of phosphorus pentachloride are added. The reaction is allowed to proceed without external application of heat for one hour, after which heat is applied gently. The solid gradually goes into solution. Heating is continued until the solution has refluxed for about one-half hour or until hydrochloric acid evolution ceases. Upon cooling, greenish-yellow crystals appear. The mass is diluted with an equal volume of petroleum ether, filtered, and the 1,5-anthracene-dicarboxylic acid chloride washed with petroleum ether and dried. It forms a dull green-yellow powder and contains a quantity of chlorine corresponding to two atoms.

It will be understood that many variations and modifications are possible in the specific procedures above set forth without departing from the spirit of this invention.

For instance, the formation of the anthracene acid chlorides may be modified according to any well known procedure for preparing acid chlorides from the corresponding carboxylic acids. Thus, instead of benzol, phosphorus oxy-chloride may be used as solvent. Or the solvent may be omitted altogether, the reactants being merely fused together. Instead of phosphorus pentachloride, thionyl chloride may be used as chlorinating agent.

We claim:

1. A compound of the general formula:

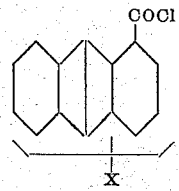

wherein X stands for another COCl group in the 4 or 5 position.

2. 1,5-anthracene-dicarbonyl-chloride.

3. 1,4-anthracene-dicarbonyl-chloride.

4. The process of producing an α,α-dicarbonyl chloride of anthracene, which comprises reacting an α,α-anthracene-dicarboxylic acid with an acid chlorinating agent.

5. The process of producing an α,α-anthracene-dicarbonyl-chloride, which comprises reacting an α,α-anthracene-dicarboxylic acid with phosphorus pentachloride.

6. The process of producing 1,5-anthracene-dicarbonyl-chloride, which comprises reacting 1,5-antharcene-dicarboxylic acid with phosphorus pentachloride.

7. The process of producing 1,4-anthracene-dicarbonyl-chloride, which comprises reacting 1,4-anthracene-dicarboxylic acid with phosphorus pentachloride.

RALPH N. LULEK.
MELVIN A. PERKINS.